INVENTOR.
ELLIOTT J. ROBERTS
ATTORNEY.

Jan. 5, 1971     E. J. ROBERTS     3,552,919

PROCESS FOR THE MANUFACTURE OF PHOSPHORIC ACID

Filed May 13, 1968     5 Sheets-Sheet 2

INVENTOR.
ELLIOTT J. ROBERTS

BY:
*D. M. Mezzapelle*
ATTORNEY.

INVENTOR.
ELLIOTT J. ROBERTS
BY
D.M. Mezzapelle
ATTORNEY.

United States Patent Office 3,552,919
Patented Jan. 5, 1971

3,552,919
PROCESS FOR THE MANUFACTURE OF
PHOSPHORIC ACID
Elliott J. Roberts, Westport, Conn., assignor to Dorr-Oliver Incorporated, Stamford, Conn., a corporation of Delaware
Filed May 13, 1968, Ser. No. 728,561
Int. Cl. C01b 25/18, 17/14
U.S. Cl. 23—165                                     17 Claims

ABSTRACT OF THE DISCLOSURE

Process for producing phosphoric acid by the acidulation of phosphate rock wherein substantially all the required acid is regenerated within the process. The preferred process comprises the steps of treating by-product calcium sulphate, in the form of gypsum, with ammonium carbonate to produce ammonium sulphate and calcium carbonate, thereafter reacting the thus produced ammonium sulphate with fluosilicic acid to produce ammonium fluosilicate crystals and sulphuric acid. The fluosilicic acid is regenerated by reacting the resulting ammonium fluosilicate with ammonium bisulphate, to produce fluosilicic acid and ammonium sulphate. The ammonium sulphate is heated to drive off ammonium and regenerate ammonium bisulphate.

---

Many processes have been proposed for making phosphoric acid, but the one in largest commercial use is the so-called "wet process" method because of its simplicity and economical operation. In this process, a phosphatic material, usually phosphate rock, is reacted with sulphuric acid to produce phosphoric acid and gypsum $$(CaSO_4 \cdot 2H_2O)$$

Phosphate rock usually comprises the mineral fluorapatite which is often represented chemically as $$9CaO \cdot 3P_2O_5 \cdot CaF_2$$

although, as is well known, the mineral does not conform exactly to this composition. Its reaction with sulphuric acid may be represented by the following general equation:

$$9CaO \cdot 3P_2O_5 \cdot CaF_2 + 10H_2SO_4 + 20H_2O$$
$$\rightarrow 6H_3PO_4 + 10CaSO_4 \cdot 2H_2O + 2HF$$

In the usual process, the phosphoric acid and gypsum are produced as a slurry which is filtered. The gypsum filter cake, after washing to recover entrained acid, is usually discarded although processes have been proposed for converting the gypsum to ammonium sulphate which is used as a fertilizer. The hydrogen fluoride may react with active silica present in the rock or purposely added to the reaction, to produce fluosilicic acid according to the reaction:

$$6HF + SiO_2 \rightarrow H_2SiF_6 + 2H_2O$$

During the acidulation reaction, and in the subsequent concentration step, a considerable portion of the fluorine is volatilized as gaseous silicon tetrafluoride and hydrogen fluoride, which must be entrapped to avoid polluting the surrounding atmosphere.

Accordingly, it is customary to pass these gases through scrubbers wherein the silicon tetrafluoride and hydrogen fluoride are condensed as fluosilicic acid. While there is a limited market for the fluosilicic acid thus produced it is the general practice to discharge it to waste ponds.

Aside from the phosphate rock, the chief ingredient in the "wet-process" method is sulphuric acid, which in turn is usually made from sulplur. Increasing world need for phosphoric acid as a fertilizer intermediate has prompted manufacturers to expand their production facilities thus increasing the demand for the already scarce supply of sulphur. Moreover, there are many areas in the world where sulphur is not readily available so that the fertilizer industry in these areas is dependent on imported sulphur.

Thus with increasing demand for the production of phosphoric acid and shrinking supply of sulphur, attempts have been made and processes have been evolved, to substitute other mineral acids as the acidulating agent, primarily hydrochloric acid and nitric acid.

However, none of these other processes have proven to be commercially attractive because when either hydrochloric acid or nitric acid is used as the acidulating agent, the resulting calcium salt is soluble and thus is not, as is gypsum, readily filterable from the phosphoric acid solution. Solvent extraction has been proposed as a one means of separating the phosphoric acid from the calcium salt, but this is expensive and has not found wide commercial acceptance. In the case of nitric acid acidulation, the resulting calcium nitrate can be removed, in part, by cooling the acidulate to a very low temperature, but the calcium not removed recombines with phosphate when the material is subsequently processed into the conventional mixed fertilizer of commerce, thereby converting $P_2O_5$ to dicalcium phosphate which is insoluble in water and of reduced value as a fertilizer material.

Thus, despite the many proposals the commercially accepted process has remained essentially unchanged.

The present invention avoids the disadvantages of the prior art methods, yet provides a process of producing phosphoric acid by digesting phosphatic material with an acid substantially all of which is derived within the process itself.

The invention, in its broad aspect, is predicated on the discovery that the acidity necessary for rock attack is regenerated by reacting ammonium fluosilicate with ammonium bisulphate to produce fluosilicic acid and an ammonium sulphate melt.

The resulting fluosilicic acid may be returned to the acidulation step to serve as the acidulating agent or, preferably, reacted with an ammonium sulphate solution, produced within the process by reacting by-product gypsum with ammonium carbonate, to produce sulphuric acid which in turn is used to acidulate the phosphatic material.

Thus, in the preferred embodiment, the invention proposes regenerating sulphuric acid in quantities sufficient to satisfy the stoichiometric requirement for the digestion of phosphate rock from gypsum and fluosilicic acid. In this way, the invention avoids the above mentioned disposal and/or pollution problems by utilizing such by-products to regenerate sulphuric acid.

Moreover, since substantially all the sulphuric acid required by the acidulation reaction may be generated by the cyclic process of this invention, phosphoric acid producers are free to expand their production facilities independent of the available sulphur supply. Furthermore, the geographical location of a phosphoric acid plant, which heretofore was dictated by the relation of the sulphur supply and the phosphate mining area, is no longer a critical economic consideration.

Thus, in accordance with the preferred embodiment of this invention, the cyclic process of regenerating sulphuric acid comprises the steps of:

(1) Reacting phosphate rock with "synthetic" sulphuric acid to produce phosphoric acid and gypsum;

(2) Reacting the gypsum produced in step 1 with an ammonium carbonate solution to produce calcium carbonate and ammonium sulphate;

(3) Passing the phosphoric acid produced in step 1 through an ammonia scrubber-evaporator stage wherein the fluosilicic acid in the phosphoric acid is precipitated as ammonium fluosilicate crystals, leaving a concentrated phosphoric acid product;

(4) Reacting the ammonium sulphate produced in step 2 with fluosilicic acid (produced in step 5) to produce ammonium fluosilicate crystals and sulphuric acid, the latter being recycled to step 1 for use in the acidulation of phosphate rock; and (5) Reacting the ammonium fluosilicate crystals from steps 3 and 4 with ammonium bisulphate to produce fluosilicic acid, which is recycled to step 4, and ammonium sulphate. The ammonium sulphate thus produced is subjected to the stripping action of hot $CO_2$ gases to volatilize ammonia and regenerate ammonium bisulphate. The resulting gases, containing ammonia and $CO_2$ are recirculated to step 2 to form ammonium carbonate.

Thus, it will be seen that the main items entering the cyclic processes are phosphate rock, $CO_2$ and heat. The resulting products are phosphoric acid and calcium carbonate:

$$Ca_3(PO_4)2 + 3CO_2 + 3H_2O \rightarrow 3CaCO_3 + 2H_3PO_4$$

Actually, as will appear hereinafter some makeup ammonia and sulphuric acid are also added to the process and some excess fluosilicic acid will probably be produced. By operating the present process in the manner set forth above efficient and economical utilization is made of the gypsum and fluosilicic acid which heretofore presented a disposal and/or pollution problem.

Considering the aforesaid process steps in more detail:

Step 1—designated as the acidulation step, is essentially a standard wet acid digestion reaction in which phosphate rock is acidulated with sulphuric acid in any conventional reactor system to produce a slurry of gypsum in phosphoric acid. In accordance with this invention, however, the sulphuric acid is a synthetic acid, i.e., and acid regenerated by the cyclic process of this invention. This slurry is filtered and the resulting gypsum cake washed, preferably with ammonium sulphate solution produced in step 2. The first filtrate from the filter, a phosphoric acid solution having a $P_2O_5$ content of about 23% is preferably further treated with phosphate rock to reduce the sulphate ion concentration. The suspension is thickened and the overflow product acid is sent to step 3. The thickened underflow is returned to the reaction system. The washed gypsum cake, saturated with ammonium sulphate solution containing some phosphoric acid, is sent to step 4.

In step 2 of this process, designated gypsum conversion step, the gypsum cake from step 1, is reacted with excess ammonium carbonate to produce a precipitate of calcium carbonate and an ammonium sulphate solution. This reaction is well known in the art. In the preferred embodiment, the resulting calcium carbonate is filtered and washed with water, the first or strong filtrate of ammonium sulphate is sent to step 1 as a wash liquor for gypsum filter cake, the weak or wash filtrate is used to absorb the ammonia and $CO_2$ coming from step 5 to produce ammonium carbonate. To assure complete recovery of the $CO_2$ coming from step 5, and to provide the excess ammonium carbonate, the absorption reaction is carried out in the presence of excess ammonia. Therefore makeup ammonia is usually added to the process at this point. Also, sulphuric acid is added to the strong filtrate prior to recycling to step 1 to neutralize the excess ammonium carbonate and to make up for any sulphate losses which may have been removed with the calcium carbonate. Alternatively, extra gypsum, from an outside source, may be brought into the cycle to make up for the sulphate losses and the ammonium carbonate boiled off and recovered.

In step 3, designated the phosphoric acid finishing step, the phosphoric acid from step 1 is preferable first ammoniated and then concentrated by evaporation. A crop of impure ammonium fluosilicate crystals, precipitated during evaporation, is separated from the acid, such as by centrifugation, and sent to step 4. It is usually preferable to minimize the amount of fluosilicate remaining in the product acid, first because it there constitutes an impurity or contaminant, second because it is needed as a recycled reactant in the process; and third, because it may be recovered as a marketable product if returned to step 4. Therefore, it is preferred to add excess ammonia to the acid in step 3, and to cool the acid before separation of the final crop of ammonium fluosilicate crystals.

The addition of ammonia depresses the solubility of ammonium fluosilicate in the acid, and increases the amount of ammonium fluosilicate recovered. The excess ammonia remains in the acid produced, but this does not detract from the process since the acid will in most cases be ammoniated subsequently to mono ammonium phosphate and/or diammonium phosphate in the production of fertilizer materials. The maximum amount of ammonia which can be added is related to the temperature to which the acid will be cooled, and also to the quantity and kind of impurities present. The amount added should not be so great that mono ammonium phosphate crystallizes during the cooling operation. It is preferred to add sufficient ammonia so that the total present will be equivalent to the fluorine as $(NH_4)_2SiF_6$, plus an amount equal to about one-quarter (¼) of the phosphorus as $NH_3H_2PO_4$. With normal Florida rock as process raw material, this permits cooling the acid to about 0° C. before mono ammonium phosphate crystallizes, and at this temperature most of the ammonium fluosilicate will have been crystallized out.

Accordingly, it is preferred to use the phosphoric acid from step 1 to initially scrub excess ammonia from gases leaving step 2. Thereafter, the resulting solution is evaporated and then cooled to about 0° C. The crystals of ammonium fluosilicate are separated from the phosphoric acid such as by centrifugation and sent to step 4. The concentrate, preferably at about 40% $P_2O_5$, is recovered as product acid.

In step 4, designated sulphuric acid regeneration step, some of the ammonium sulphate wash filtrate from step 1 is used to wash the ammonium fluosilicate crystals formed in step 3 and also the crystals formed in this step. The wash solution is then combined with the remaining portion of the wash filtrate from step 1 and used to absorb fluosilicic acid vapors coming from step 5. The resulting reaction produces a mixture of sulphuric acid and ammonium fluosilicate.

It has been discovered that the solubility product of ammonium fluosilicate is unexpectedly low in the reaction mixture, comprising sulphuric acid, being in the preferred embodiment of the process hereinafter described over one order of magnitude less than its solubility in water. Therefore, the reaction results in crystallization of ammonium fluosilicate crystals. The reaction generates much heat and causes vaporization of a substantial amount of water. In order to maximize absorption of fluosilicic acid it is desirable to operate at less than the atmospheric boiling point of the reaction mixture. This also reduces the amount of ammonium fluosilicate retained in solution. It is preferred to remove reaction heat in a vacuum cooler operated at a temperature of about 50° C. The ammonium fluosilicate crystals are separated from the reaction mixture preferably first in a thickener and then in a centrifuge combined with the ammonium fluosilicate crystals from step 3 and sent to step 5. The thickener overflow, a 25% solution of sulphuric acid containing about 10% phosphoric acid and about 10% ammonium fluosilicate, constitutes the "synthetic" sulphuric acid for the acidulation reaction in step 1. Some excess fluosilicic acid is removed from the cyclic stream in this step and sent to disposal.

In step 5, designated fluorine and ammonia evolution step, the ammonium fluosilicate crystals from step 4 are decomposed by reaction with molten ammonium bisulphate.

$$(NH_4)_2SiF_6 + 2(NH_4)HSO_4 \rightarrow H_2SiF_6 + 2(NH_4)_2SO_4$$

The resulting vapors containing fluosilicic acid, are evolved and stripped from the melt preferably first at atmospheric pressure, then under vacuum, and finally under vacuum with steam as a stripping agent. This stagewise treatment of the reaction mixture evolves substantially all the fluorine from ammonium fluosilicate as fluosilicic acid which is sent to step 4 for absorption. A small amount of $NH_3$ will also be evolved in this step. In order to minimize the amount of $NH_3$ thus evolved with the fluosilicic acid, it is preferred to operate this step at a temperature not greatly above the fusion point of the reaction mixture.

The resulting melt, enriched in ammonium sulphate, is treated to decompose at least part of the ammonium sulphate into ammonium bisulphate and ammonia gas, the latter being preferably stripped from the melt by the action of $CO_2$ gas, such as flue gases. The gases from this step, containing ammonia and $CO_2$, may advantageously be sent to step 2 for absorption and ammonium carbonate production.

It will usually be necessary to bleed off a small flow of ammonium sulphate melt from step 5 to prevent build-up of non-volatile impurities which may be carried into this step with the ammonium fluosilicate crystals from step 4.

In order that it may be clearly understood and readily carried into effect, the invention will now be described, by way of example, with reference to the accompanying diagrammatical drawings in which.

Figure 1:
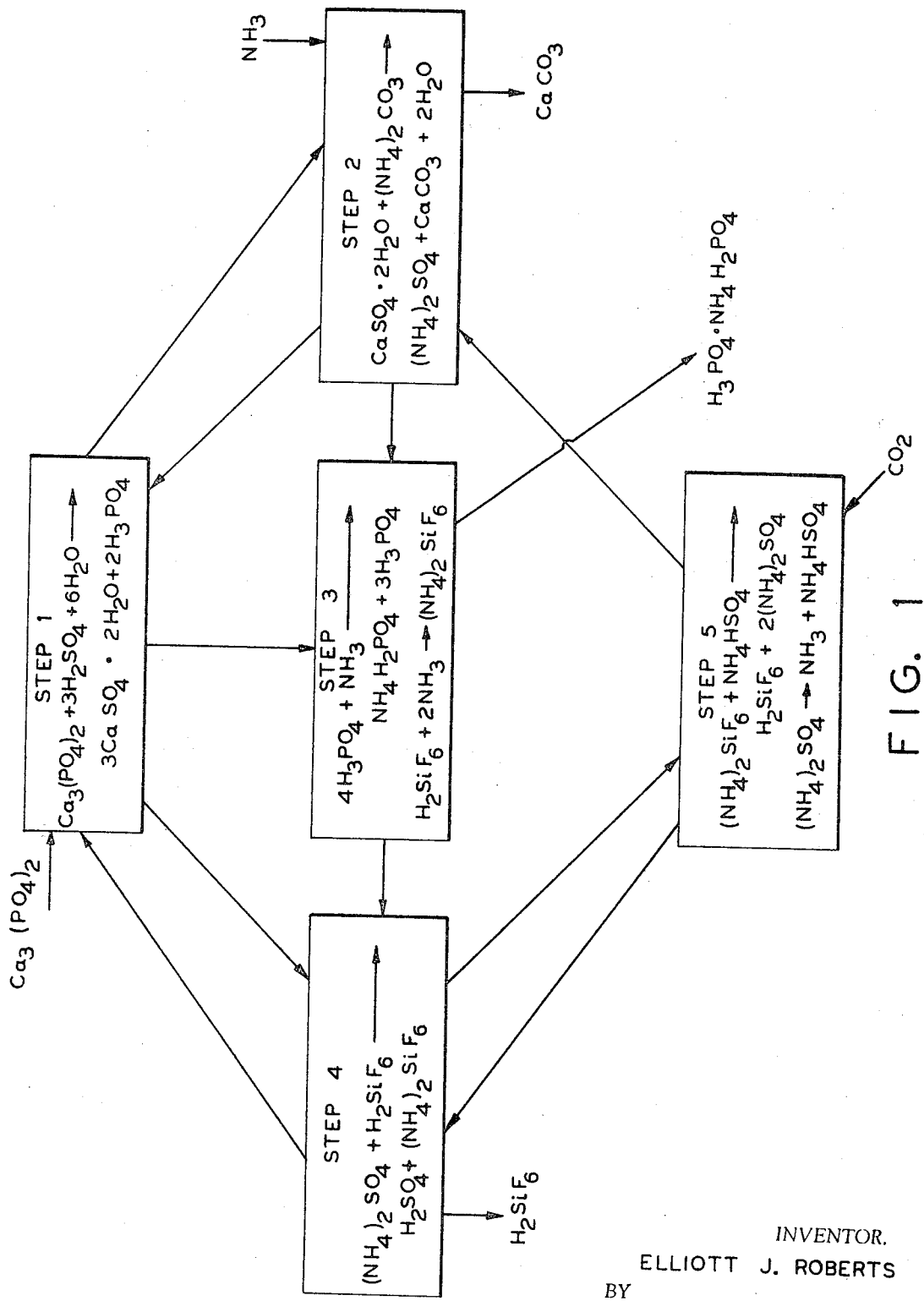
FIG. 1 is a block flowsheet showing the overall cyclic process steps of this invention.

Referring now to the drawings, FIG. 1, shows the overall cyclic nature of the process of this invention with each of the process steps, as hereinbefore described, designated by a block.

The process may be envisioned as constituting a plurality of continuously circulating regenerating streams moving around a product acid take-off step. Thus, in accordance with this invention, the sulphate ion is regenerated from the calcium sulphate and made available in the form of ammonium sulphate, while the hydrogen ion is regenerated from the ammonium fluosilicate and made available in the form of fluosilicic acid.

Sulphuric acid is regenerated by reacting the thus produced ammonium sulphate with fluosilicic acid.

The apparatus for carrying out the process of steps 1 through 5 is diagrammatically illustrated in FIGS. 2 through 6 respectively.

Step 1—Acidulation step

Figure 2:
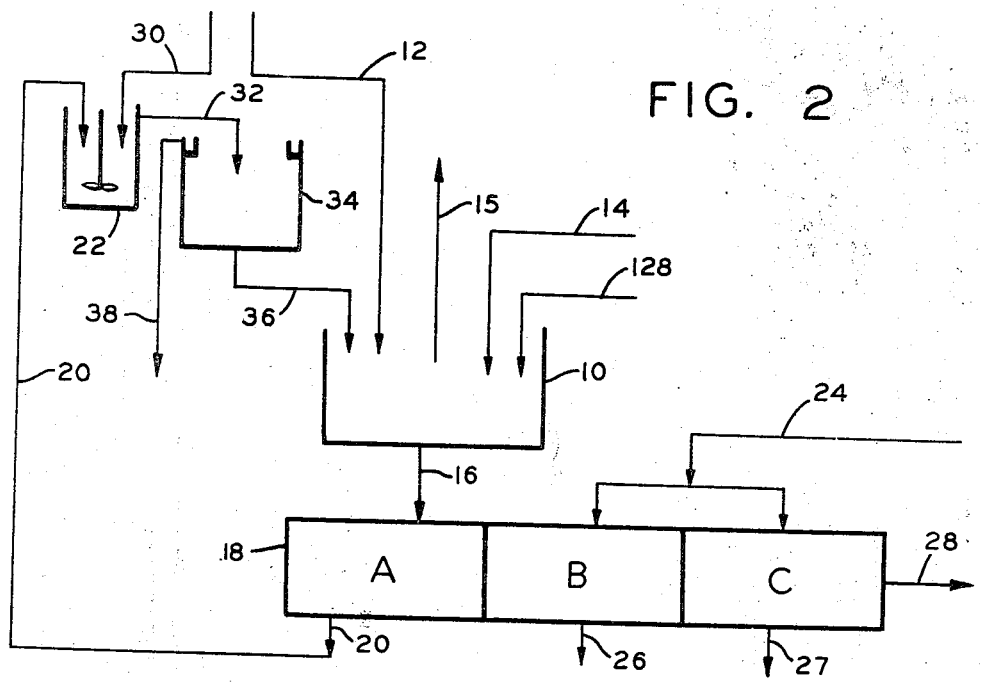
FIG. 2 is a detailed representation of the acidulation step.

Referring to FIG. 2 there is shown a reaction vessel 10 wherein the reaction between sulphuric acid and phosphate rock takes place as in the conventional "wet process" method. While we have shown a single tank reactor it is to be understood that any form of the reactor(s) may be used, such as a plurality of interconnected reaction vessels, since the invention is not predicated on a form of the reactor used. Moreover, while not shown, it is to be understood that the reactor is provided with suitable agitating devices, cooling and evaporating means, etc. all of which are well-known in the art.

As shown, phosphate rock, suitably ground, is added via line 12 to reactor 10 while sulphuric acid, regenerated in step 4, is added via line 14. Also added to said reactor 10 via line 128 is the gypsum suspension from the ammonium fluosilicate leaching in step 4. The resulting product which is a slurry of gypsum in phosphoric acid is transferred via line 16 to a filter 18, in which may be any of the conventional filters used in the art, for example a tipping pan filter. The gaseous reaction products are transferred via line 15 to a scrubber, not shown, for recovery and disposal.

The design and operation of the filter is well known to those skilled in the art and therefore a detailed description of the filter will not be presented herewith, however, it my be worthwhile to mention that the filter as depicted in the drawings, is generally divided into three continuously moving stages A, B and C; the first stage A being the "form" stage in which the slurry is fed on a filter cloth and a strong filtrate recovered; the second stage B being the first wash stage in which the filter cake is washed with a suitable wash liquor and a weak filtrate recovered; the third stage C being the final wash stage, prior to cake discharge, the filtrate having essentially the same composition as the wash liquor. After cake discharge the cycle is repeated.

On filter 18, the thus produced phosphoric acid is separated as strong filtrate and preferably transferred via line 20 to an agitated desulphating tank 22, to be described hereinafter. The remaining filter cake of impure gypsum is subjected to stagewise washing with ammonium sulphate solution, transferred via line 24, from step 2.

As will be discussed more fully hereinafter the filtrate from each of the washing stages is separately recovered and transferred via lines 26 and 27 to step 4. The washed gypsum filter cake is removed from filter 18 and transferred via line 28 to step 2. In the practice of this invention, it is preferred to reduce the sulphate content of the strong filtrate so that there is present in the acid an excess of neither sulphate or calcium oxide. While this practice maximizes the amount of gypsum precipitating in step 3, it reduces the amount of sulphuric acid required as make-up and also leads to an eventual diammonium phosphate product with a low sulphate content.

Thus, in accordance with the preferred practice, the strong filtrate coming from filter 18 is transferred via line 20 to a desulfating tank 22 into which there is also added via line 30 a predetermined portion of ground phosphate rock. The resulting mixture is transferred via line 32 to a thickener 34 wherein the resulting solids are removed as the underflow and thereafter, transferred via line 36 to the single tank reactor 10. The thickener overflow, comprising a 23% $P_2O_5$ acid with a dissolved impurities including fluorine compounds is transferred via line 38 to step 3.

Step 2—Gypsum conversion

In this step the gypsum from step 1 is reacted with ammonium carbonate to produce an ammonium sulphate solution, which is recycled as wash liquor to step 1, and calcium carbonate, which may be discarded. The apparatus comprises a tank 40, a thickener 44, a filter 48 and an absorption tower 62.

Figure 3:
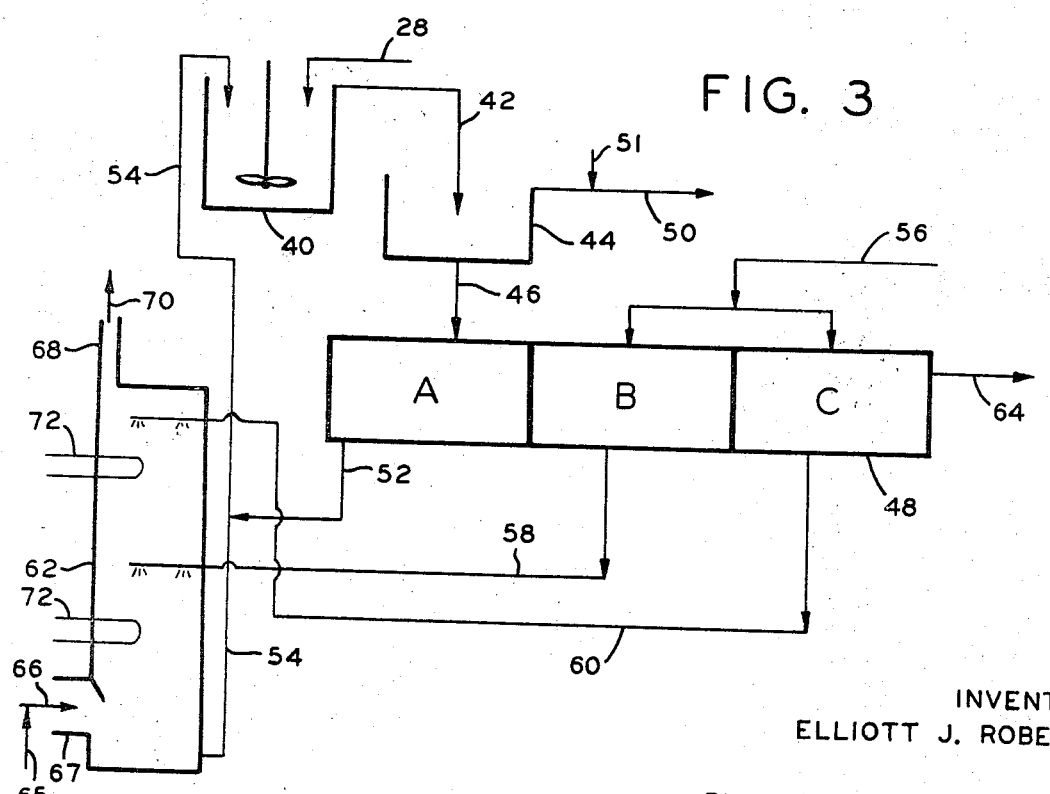
FIG. 3 is a detailed representation of the gypsum conversion step.

Referring to FIG. 3, washed gypsum filter cake saturated with ammonium sulphate solution is transferred via line 28 from filter 18 in FIG. 2 to an agitated tank 40 wherein it is reacted with ammonium carbonate solution. The resulting slurry, comprising calcium carbonate and ammonium sulphate solution, is transferred via line 42 to a thickener 44, where the solids, principally calcium carbonate, settle to the bottom and are removed via line 46 to a filter 48 such as a tipping pan filter as hereinbefore described.

The overflow containing, principally, ammonium sulphate solution is transferred via line 50 to step 1 where it is utilized as wash liquor on the filter as described. As noted above, sulphuric acid is preferably added to the ammonium sulphate wash liquor, such as via line 51, to neutralize the excess ammonium carbonate and to make up for any sulphate losses. On filter 48, the first filtrate, a strong ammonium sulphate solution, is removed via line 52 and transferred together with an ammonium carbonate solution to tank 40 via line 54.

The filter cake, mainly calcium carbonate, is subjected to stagewise washing with water introduced via line 56. The second and third filtrates from filter 48 are separately recovered and transferred via line 58 and 60, respectively, to an absorption tower 62, wherein they act as scrubber liquor for the ammonia and $CO_2$ gases introduced therein.

The washed calcium carbonate cake is removed via line 64 and discharged to waste. Alternatively, this cake may be calcined to produce lime and $CO_2$ which, in turn, may be recycled to step 5. In the absorption tower 62, the gases from step 5, containing ammonia and $CO_2$ along with makeup ammonia added through line 65, are introduced via line 66 into tower inlet 67 whereupon rising they come in contact with the above mentioned scrubber liquor.

As shown, the liquor is preferably spray fed into the tower at different levels with the filtrate in line 60 going to the upper-most absorption stage because of the low ammonium carbonate concentration in this solution.

After absorbing the $CO_2$ and ammonia in the uprising gases the liquor, a solution of ammonium carbonate, falls to the bottom of the tower 62 and is transferred via line 54 to tank 40.

The scrubbed gases, containing the excess ammonia gas leave tower 62 through the top outlet 68 and are transferred via line 70 to step 3.

In practice it is preferred to maintain the temperature in absorption tower 62 at about 50° C. Accordingly tower 62 is provided with cooling coils 72.

Step 3—Phosphoric acid finishing step

In this step, the phosphoric acid produced in step 1 is concentrated to a $P_2O_5$ content of about 40% and the fluorine content reduced to about 0.5%. The apparatus generally comprises an ammonia scrubbing tower 74, and evaporator 90 and a crystallizer 106.

Figure 4:
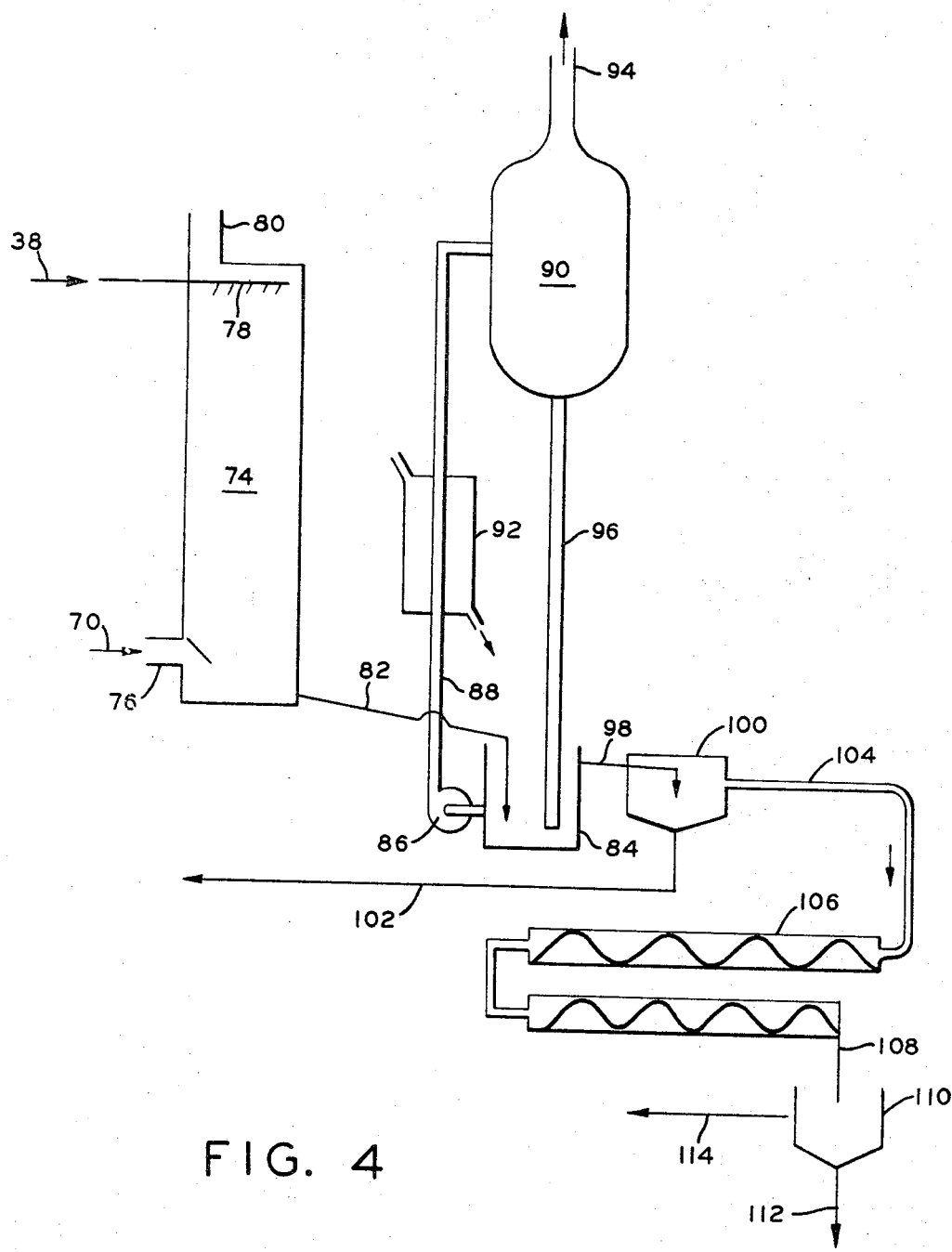
FIG. 4 is a detailed representation of the phosphoric acid finishing step.

Referring to FIG. 4 there is shown an ammonia scrubbing tower 74 provided at its lower end with an inlet port 76, spray nozzle 78 and an outlet port 80 at its upper and for scrubbed gases. The gaseous stream from the absorption tower 62 of FIG. 3 containing the excess ammonia gas is introduced via line 70 into the inlet port 76, whereupon rising they come in contact with the phosphoric acid transferred via line 38 from step 1 and spray fed into tower 74.

After absorbing the ammonia, the solution containing phosphoric acid, ammonium phosphate, ammonium fluosilicate and calcium sulphate is transferred via line 82, preferably to a seal tank 84 where it is pumped by pump 86 through line 88 to an evaporator 90.

In order to retain as much of the ammonia fluosilicate in solution as possible the temperature in the evaporator is maintained at its highest practical level, preferably about 80° C. As shown, line 88 is provided with a heat exchanger 92 to heat the solution prior to evaporation.

In the evaporator 90, the concentrated solution falls into the barometric leg 96 the end of which is immersed in the solution in seal tank 84. The gases evolved in the evaporator 90, generally water vapor, pass through the evaporator outlet 94 to a condenser, not shown. The evaporator product overflows seal tank 84 and is transferred via line 98 to a thickener 100.

In the thickener gypsum and some ammonium fluosilicate settle out which are removed as underflow and transferred via line 102 to step 4. The thickener overflow, a phosphoric acid-ammonium fluosilicate solution, is transferred via line 104 to a crystallizer 106 where the solution is cooled to about 0° C., whereupon most of the ammonium fluosilicate crystallize out. The resulting suspension is transferred via line 108 to a separator 110, where the ammonium fluosilicate crystals are separated and transferred via line 112 to step 4. The mother liquor, a 40% $P_2O_5$ solution is recovered as product via line 114.

Step 4—Sulphuric acid regeneration step

In this step sulphuric acid is regenerated by reacting the ammonium sulphate, produced in step 2 and the fluosilicic acid coming from step 5.

Figure 5:
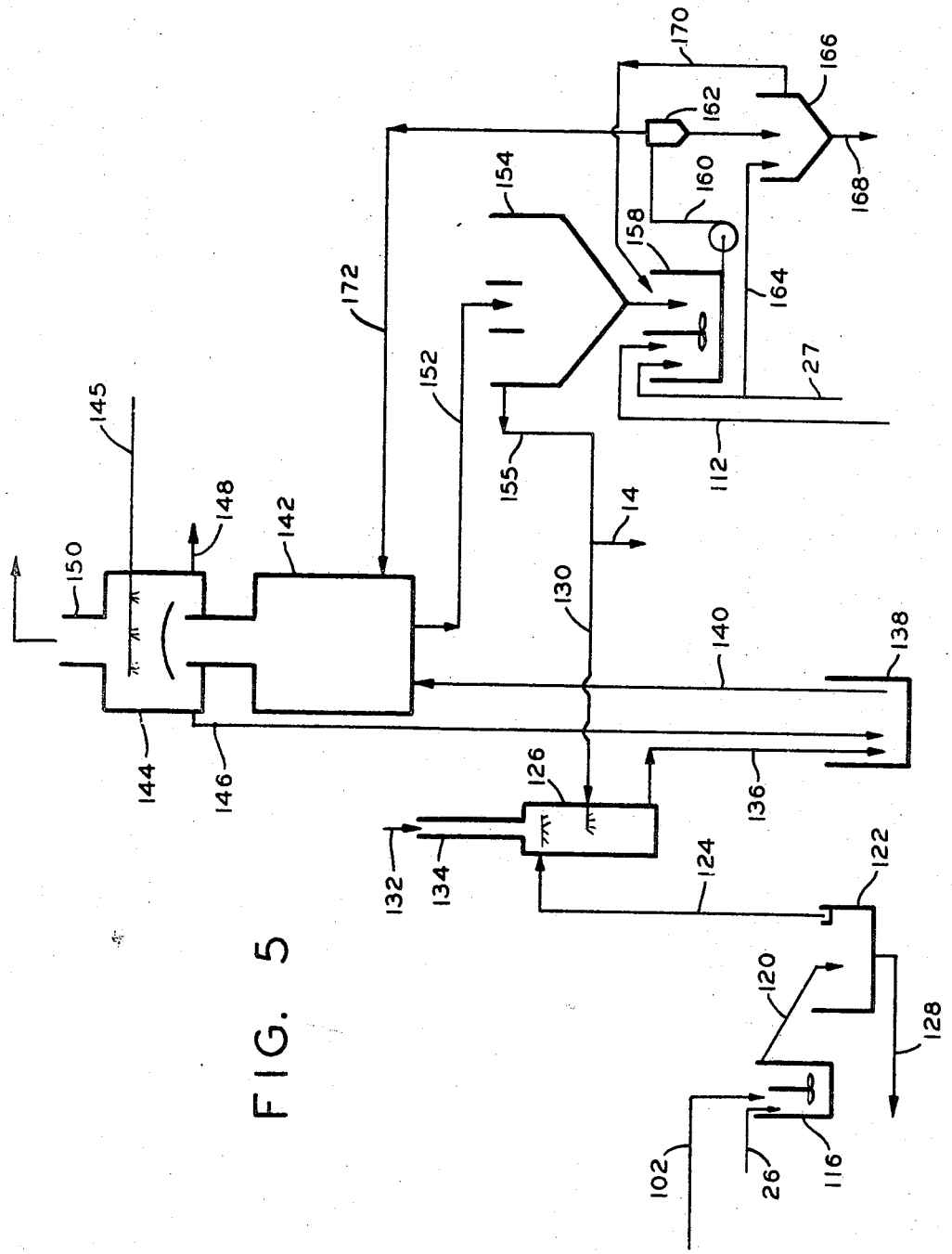
FIG. 5 is a detailed representation of the sulphuric acid regeneration step.

The apparatus for carrying out this step includes a leaching circuit, a sulphuric acid regeneration circuit and a crystal washing circuit. As shown in FIG. 5, thickener underflow, from FIG. 4, a suspension of ammonium fluosilicate and gypsum, is transferred via line 102 to a heated leaching tank 116, where it is mixed with the first wash filtrate, an ammonium sulphate solution, coming via line 26 from filter 18 of FIG. 2. The resulting mixture is transferred via line 120 to a thickener 122 where the leached ammonium fluosilicate solution is removed as overflow and transferred via line 124 to a scrubber absorption tower 126. The underflow, from thickener 122, a gypsum suspension is transferred via line 128 to reactor 10 of FIG. 2 as hereinbefore described.

In scrubber tower 126 the leached ammonium fluosilicate solution along with some recycled sulphuric acid solution, introduced via line 130, is used to scrub the fluorine containing gases coming from step 5 which, as shown, are introduced via line 132 into scrubber inlet 134.

The resulting sulphuric acid and ammonium fluosilicate solution is transferred via line 136 to a seal tank 138 where it is transferred via line 140 to a vacuum evaporator 142 maintained at a temperature of about 50° C. and provided with a reflux chamber 144. In the reflux chamber 144, the fluorine vapors evolved in the evaporator 142 are scrubbed with water, spray fed via line 145, to produce a condensate containing fluosilicic acid. A portion of the thus produced condensate is returned via line 146 to seal tank 138 while another portion is discharged as a by-product via line 148. The uncondensed gases, generally water vapor, leave the reflux chamber 144 through outlet port 150 to a condenser, not shown.

In evaporator 142 substantial amount of the ammonium fluosilicate crystallizes out forming a suspension of crystalline ammonium fluosilicate in sulphuric acid which is transferred via line 152 to a thickener 154.

In thickener 154 the crystalline material reports to the underflow and is transferred via line 156 to a repulping tank 158. The thickener overflow, a sulphuric acid-ammonium fluosilicate solution is removed via line 155 and divided into two portions; the first portion being delivered via line 14 to the single tank reactor 10 of FIG. 2 as the acidulating agent, the second portion being recycled via line 130 to the scrubber absorber 126.

In repulper 158, the ammonium fluosilicate crystals separated in thickener 154 are combined with ammonium fluosilicate crystals coming from step 3 through line 112 and washed with the wash filtrate transferred via line 27 from filter 18 of FIG. 2.

As hereinbefore mentioned the wash filtrate of filter 18 is recovered in two portions, the second wash filtrate being a relatively pure ammonium sulphate solution with little or no phosphoric acid present. This filtrate is used as the wash liquor for the ammonium fluosilicate crystals because any $P_2O_5$ would accumulate in step 5. Thus, as shown, the ammonium fluosilicate crystals are initially repulped with a portion of the second wash filtrate coming from filter 18 and then transferred via line 160 to a separator 162, such as a cyclone where the wash liquor is separated from the crystals. Thereafter the crystals are transferred to a separator 166, such as a centrifugal separator, and washed again with another portion of said second wash filtrate, introduced via line 164.

The washed ammonium fluosilicate crystals are transferred via line 168 to step 5.

The separated wash liquor from separator 166 is recycled via line 170 to the repulper 158, while the wash liquor, separated in separator 162, is transferred via line 172 to the evaporator 142.

Step 5—Fluorine-ammonia evolution step

In this final step of the cyclic process, fluosilicic acid for step 4 and ammonia from step 2 are regenerated.

Figure 6:
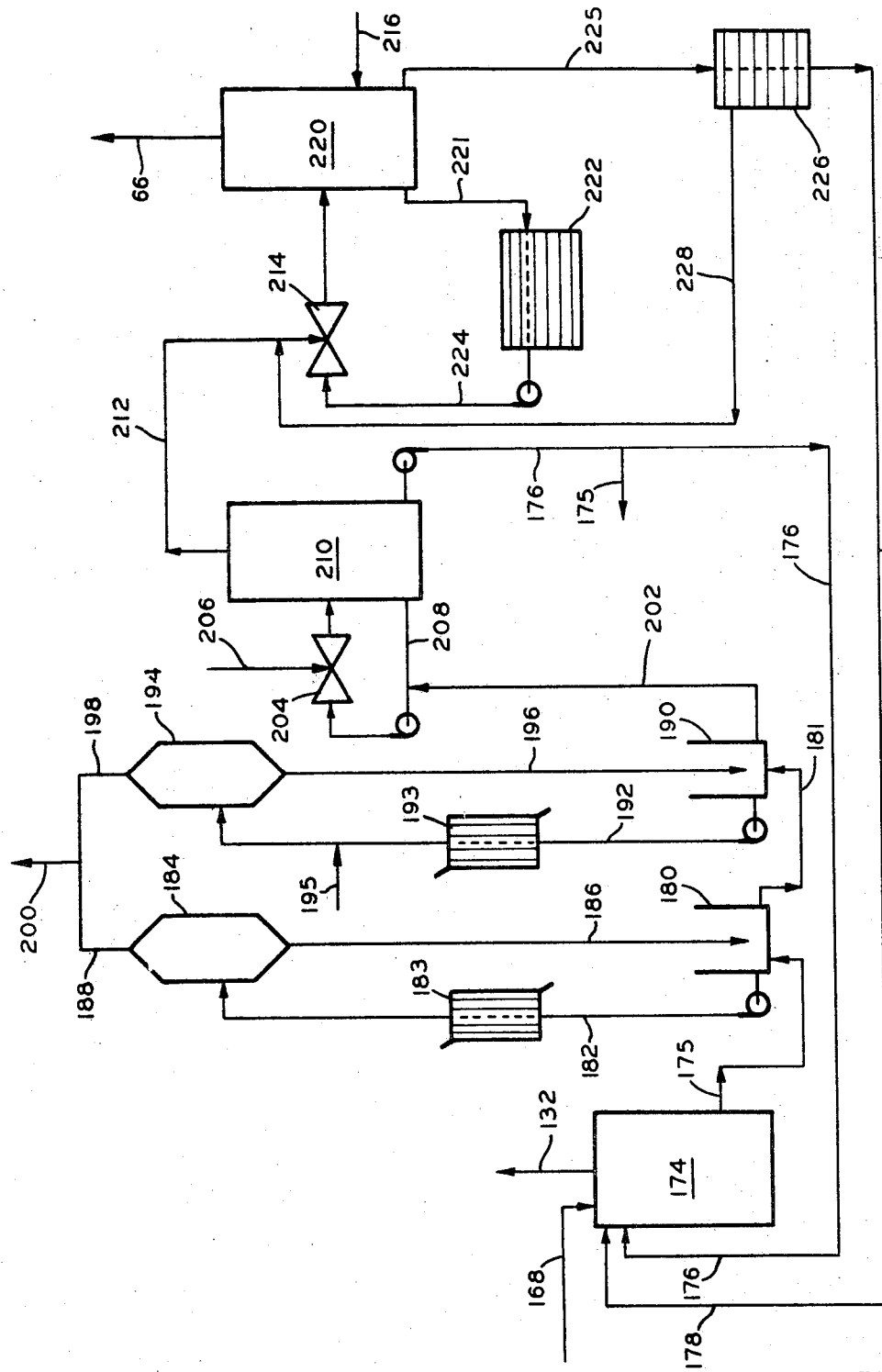
FIG. 6 is a detailed representation of the fluorine and ammonia evolution step.

Referring to FIG. 6, it will be seen that the apparatus for carrying out this step comprises essentially a series of decomposition vessels and separators wherein the fluorine and ammonia are evolved.

The apparatus includes a first reaction tank 174, where decomposition of the ammonium fluosilicate takes place with the evolution of about 50% of the input fluorine, a vacuum evaporation station here shown as comprising two evaporators 184 and 194 where additional fluorine evolution takes place; a stripping tank 210 where ammonia is stripped from ammonium sulphate and ammonium bisulphate regenerated and an ammonia recovery tank 220.

In more detail, the washed ammonium fluosilicate crystals from step 4 are fed via line 168 into reactor 174 along with a hot melt of ammonium bisulphate and some recovered ammonium fluoride which, as shown, are recycled via line 176 and 178 respectively from a later stage in this step. Reactor 174 is preferably maintained at atmospheric pressure and at a temperature of about 260° C., at which temperature and in the presence ammonium bisulphate decomposition of the ammonium fluosilicate takes place with the evolution of fluosilicate acid vapors. These vapors are transferred to line 132 to the scrubber absorber tank 126 in FIG. 5. The remaining melt, principally ammonium sulphate and excess bisulphate with dissolved fluosilicic acid is removed from said reactor 174 and transferred via line 175 to the vacuum evaporator station comprising evaporators 184 and 194, connected in series for sequential evolution of the remaining fluosilicic acid values. As shown, the melt from reactor 174 is initially transferred to seal tank 180 where it is pumped via line 182 to evaporator 184 maintained at a temperature of about 260° C., and at a pressure of 4.8″ Hg absolute. In evaporator 184 about 43% of the input fluorine is evolved which is removed through line 188, and sent to a condenser, now shown, via line 200.

The remaining melt falls into barometric leg 186 the end of which is immersed in seal tank 180. From tank 180 a portion of the melt is transferred via line 181 to seal tank 190 from where it is pumped via line 192 to evaporator 194, also maintained at a temperature of about 260° C. and at a pressure of 4.8″ Hg absolute. In evaporator 194 the remaining fluorine in the melt is denser, not shown, via line 200.

The remaining melt, substantially free of fluorine, falls into barometric leg 196 the end of which is immersed in seal pot 190. In order to maintain the temperature in the evaporators at about 260° C., line 182, 192 are provided with heat exchanges 183, 193 respectively. Line 192 is further provided with a steam inlet 195 for sweeping out the fluosilicic acid vapors evolved in evaporator 194.

From tank 190, the ammonium sulphate melt is transferred via line 202 to a jet scrubber 204 where it comes in contact with hot $CO_2$ gases, preferably flue gases, having a temperature of about 975° C., introduced via line 206. In the scrubber 204, the ammonium sulphate is stripped of the ammonia picked up from the ammonium fluosilicate.

The resulting mixture is transferred to an entrainment separator 210, which is operated at temperatures of about 385° C., where the stripped ammonia plus some hydrogen fluoride and silicon tetrafluoride are evolved leaving a melt of chiefly ammonium bisulphate, a major portion of which is recycled via line 176 to tank 174, thus completing the circuit. The remaining portion is recycled via line 208 to scrubber 204. As shown, line 176 is provided with a bleed line 175 to purge the system of impurities.

The ammonia containing gases are removed from separator 210 via line 212 and introduced into a Venturi scrubber 214 where they are scrubbed with a relatively cool ammonium fluoride solution coming from separator 220 via line 224 and which has been circulated through a heat exchanger 222. In the scrubber 214 any residual fluorine containing compounds chiefly HF, in the gases are condensed and thereafter separated from the scrubbed gases in separator 220. The relatively cool scrubbed gases containing ammonia and $CO_2$ are sent via line 66 to tower 62 in FIG. 3.

The liquor in separator 220, an ammonium fluoride solution, is recirculated, in part, via line 221 to scrubber 214 through heat exchanger 222 and line 224 as indicated above. Another portion of said liquor is transformed to line 225 to evaporator 226 where the ammonium fluoride is converted in part to ammonium bifluoride which is recirculated via line 178 to tank 174. The vapors generated in evaporator 226, comprising mainly water, vapor and ammonia, are recirculated via line 228 to Venturi scrubber 214 for ammonia recovery. Make-up water, as necessary, is added to scrubber 220 through line 216.

In order that those skilled in the art may better understand how the present invention can be practiced, the following example is given by way of illustration. This example follows the process steps as described above.

STEP 1

Acidulation 300 grams of Florida phosphate rock analzying 31.2% $P_2O_5$ was reacted at 70° with 906 grams of a solution derived from $(NH_4)_2SO_4$ and $H_2SiF_6$ by the process of step 4. This solution analyzed as follows:

| | Percent |
|---|---|
| $SO_4$ | 25.93 |
| $P_2O_5$ | 10.0 |
| $NH_3$ | 2.15 |
| F | 5.90 |

The resulting slurry of gypsum in impure phosphoric acid was filtered. The solids, after washing and drying, weighed 426 grams. Cake and mother liquor had the following analyses:

| Filter cake solids: | Percent |
|---|---|
| $SO_4$ | 50.4 |
| $P_2O_5$ | 2.21 |
| $NH_3$ | 0.035 |
| F | 0.28 |

| Mother liquor: | |
|---|---|
| $SO_4$ | 3.4 |
| $P_2O_5$ | 21.5 |
| $NH_3$ | 2.28 |
| F | 7.28 |

STEP 2

Gypsum conversion 420 grams of gypsum derived from phosphate rock by the process of step 1 was reacted with 641 grams of a solution containing 120 grams of $(NH_4)_2SO_4$ and 259 grams of $(NH_4)_2CO_3$ at 60° C. for a total of about two hours. The resulting precipitate was filtered from the mother liquor. The filter cake was washed with hot water and was dried. Analyses were as follows:

| Mother liquor: | Percent |
|---|---|
| $SO_4$ | 23.8 |
| $P_2O_5$ | 0.014 |
| $NH_3$ | 8.35 |

| Washed filter cake: | |
|---|---|
| $SO_4$ | 3.6 |
| $P_2O_5$ | 0.005 |
| $NH_3$ | 0.47 |

About 95% of the incoming gypsum was converted to ammonium sulphate in a solution of about 34% ammonium sulphate.

STEP 3

Phosphoric acid finishing 426 grams of mother liquor from step 1 was partially neutralized with 31.7 grams of 28% ammonia solution. It was then evaporated under vacuum at 60° C. to 292 grams. The resulting liquor was cooled to 0° C. and the resulting solids separated by filtration. The mother liquor showed the following analysis:

| | Percent |
|---|---|
| $SO_4$ | 6.11 |
| $P_2O_5$ | 40.0 |
| $NH_3$ | 4.17 |
| F | 0.48 |

This is an impure phosphoric acid product well suited for processing into fertilizer. It carries only about 10% of the fluorine originally present in the rock. (Note that the fluorine concentration corresponding to a saturated solution of ammonium fluosilicate in water at 0° C. is about 8.0%) The filter cake was predominantly ammonium fluosilicate containing small quantities of gypsum and other impurities.

STEP 4

Sulphuric acid regeneration

A solution was prepared by washing gypsum filter cake from step 1 with ammonium sulfate solution. It analyzed:

| | Percent |
|---|---|
| $H_3PO_4$ | 10.7 |
| $(NH_4)_2SO_4$ | 29.2 |
| $(NH_4)_2SiF_6$ | 1.4 |
| $H_2SiF_6$ | 2.4 |

1068 grams of this solution were reacted with 1213 grams of 29% $H_2SiF_6$ and the product was evaporated at 60° C. During the treatment ammonium fluosilicate crystals were formed, and a certain amount of fluorine gases were evolved. Mother liquor from the resulting suspension showed the following analysis:

| | Percent |
|---|---|
| $H_3PO_4$ | 14.9 |
| $H_2SO_4$ | 30.2 |
| $(NH_4)_2SiF_6$ | 8.6 |
| $H_2SiF_6$ | 1.95 |

The solubility of $(NH_4)_2SiF_6$ in water is reported as 28.75% so it is seen that 8.6% in the reaction mother liquor it is fortunately and unexpectedly low. In the example, 82% of the fluorine was eliminated either in gases or crystals, and 85% of the ammonium.

STEP 5

Fluorine—Ammonia evolution 558 grams of $NH_4HSO_4$ were heated to 300° C. and 150 grams of $(NH_4)_2SiF$ were slowly added. The gases were collected and found to contain about 60% of all the F introduced. 25.2 grams of steam were then passed through the melt. The collected vapors were found to contain another 24% of the input fluorine. After passage of about 100 grams of steam the residual melt was analyzed and found to contain under 0.2% of the original input fluorine.

While the preferred embodiment of my invention has been described, it should be recognized that the sequence of solids separation steps is to a large degree a matter of expediency, it being necessary only to isolate a relatively pure crop of ammonium fluosilicate crystals.

For example, phosphate rock may be reacted with fluosilicic acid and ammonium sulphate, either simultaneously or sequentially, to precipitate a mixed crop of calcium sulphate, usually as gypsum, and ammonium fluosilicate crystals. The precipitated solids, after separation from the mother liquor, are separated by leaching out the ammonium fluosilicate leaving the calcium sulphate as a solid.

The resulting ammonium fluosilicate solution is evaporated and/or cooled to crystallize a crop of relative pure ammonium fluosilicate which is thereafter subjected to decomposition in the presence of a melt containing ammonium bisulphate by the process described in step 5 above.

The resulting fluosilicic acid is returned to the acidulation step.

The phosphoric acid containing mother liquor, which was separated from the mixed crop of calcium sulphate and ammonium fluosilicate, is sent to desulphation and then to the finishing step (step 3).

Thus, according to this embodiment, the acidity necessary for rock attack is provided by fluosilicic acid which is produced by decomposing ammonium fluosilicate in the presence of a melt containing ammonium bisulphate.

It should be further recognized that the invention is not limited to the acidulation of phosphate rock but rather has broad application to the treatment of calcareous phosphatic materials.

Moreover, while the invention has been described in connection with the precipitation and conversion of gypsum ($CaSO_4 \cdot 2H_2O$) it is to be understood that the calcium sulphate may be precipitated as the anhydrite ($CaSO_4$) or the hemi-hydrate ($CaSO_4 \cdot \frac{1}{2}H_2O$) and converted as hereinbefore described.

I claim:

1. Process for the manufacture of phosphoric acid by the reaction of phosphatic material with acid including sulphuric acid resulting in the production of calcium sulphate and fluorine compounds which comprises; reacting said by-product calcium sulphate with ammonium carbonate to produce an ammonium sulphate solution and calcium carbonate; reacting the thus produced ammonium sulphate solution with fluosilicic acid to produce sulphuric acid and ammonium fluosilicate crystals; reacting the thus produced ammonium fluosilicate crystals with ammonium bisulphate to produce fluosilicic acid and an ammonium sulphate melt; recycling the thus regenerated fluosilicic acid for further reaction with said ammonium sulphate solution; decomposing the ammonium sulphate melt to regenerate ammonium bisulphate and ammonia gas; and utilizing the regenerated sulphuric acid in the acidulation of said phosphatic material to produce phosphoric acid, calcium sulphate and fluorine compounds.

2. Process according to claim 1, wherein the thus produced phosphoric acid is initially ammoniated and then concentrated to crystallize, as ammonium fluosilicate, fluorine compounds present in the acid.

3. Process according to claim 2, wherein said concentration is effected at a temperature of about 80° C.

4. Process according to claim 2, wherein said concentrated acid is cooled to about 0° C.

5. Process according to claim 2, wherein said phosphoric acid is concentrated to a $P_2O_5$ content of 40%.

6. Process according to claim 2, wherein the mole ratio of P to $NH_3$ is about 4:1.

7. Process according to claim 1, wherein the calcium sulphate is filtered from said phosphoric acid and said calcium sulphate is washed with ammonium sulphate solution.

8. Process according to claim 1, wherein the reaction between ammonium sulphate solution and fluosilicic acid is conducted at a temperature of about 50° C. to crystallize ammonium fluosilicate.

9. Process according to claim 1, wherein the reaction between ammonium fluosicate crystals and ammonium bisulfate is conducted at a temperature from about 260° to about 300° C.

10. Process of producing phosphoric acid by the reaction of phosphate rock with acid including sulphuric acid comprising the steps of; reacting in a first treatment zone phosphate rock with sulphuric acid to produce a slurry of gypsum in phosphoric acid; reacting in a second treatment zone the thus produced gypsum with ammonium carbonate to produce an ammonium sulphate solution and calcium carbonate; separating the thus produced ammonium sulphate solution from said calcium carbonate; ammoniating and then concentrating in a third treatment zone the phosphoric acid produced in said first treatment zone to precipitate fluorine compounds in said phosphoric acid as ammonium fluosilicate crystals; reacting in a fourth treatment zone said ammonium sulphate solution with fluosilicic acid to produce sulphuric acid and ammonium fluosilicate crystals; recycling the thus produced sulphuric acid to said first treatment zone for further reaction with phosphate rock; reacting in a fifth treatment zone the ammonium fluosilicate crystals heretofor produced with an ammonium bisulphate melt to produce fluosilicic acid and an ammonium sulphate melt and recycling to said fourth treatment zone the thus produced fluosilicic acid for further reaction with said ammonium sulphate solution.

11. Process according to claim 10, wherein the ammonium sulphate melt produced in said fifth treatment zone is decomposed to regenerate an ammonium bisulphite melt ammonia gas.

12. Process according to claim 11, wherein said decomposition is carried out in the presence of hot $CO_2$ gas and the spent $CO_2$ gas and stripped ammonia gas are used to produce ammonium carbonate.

13. Process of producing phosphoric acid by the reaction of phosphate rock with acid including sulphuric acid comprising the steps of; reacting in a first treatment zone phosphate rock with sulphuric acid to produce a slurry of gypsum in phosphoric acid; separating in a first separation zone the thus formed acid from gypsum; reacting in a second treatment zone the separated gypsum with ammonium carbonate to produce ammonium sulphate and calcium carbonate; separating in a second separation zone the thus produced ammonium sulphate from calcium carbonate; recycling said separated ammonium sulphate to said first separation zone while discharging as by-product calcium carbonate; washing in said first separation zone the separated gypsum with said recycled ammonium sulphate; initially recovering in a third treatment zone the ammonia from the gases leaving the second treatment zone by scrubbing said gases with phosphoric acid separated in said first separation zone; concentrating in said third treatment zone the phosphoric acid solution resulting from said scrubbing operation to a $P_2O_5$ content of about 40%, cooling said concentrated solution to crystallize ammonium fluosilicate; separating in a third separation zone the thus crystallized ammonium fluosilicate from the concentrated phosphoric acid; recovering as product acid the thus separated concentrated phosphoric acid; reacting, in a fourth treatment zone the ammonium sulphate separated in said second separation zone and used as wash liquor in said first separation zone with fluosilicic acid to produce sulphuric acid and ammonium fluosilicate; separating in a fourth separation zone the thus produced sulphuric acid from ammonium fluosilicate crystals; recycling the thus separated sulphuric acid to said first treatment zone for further acidulation of phosphate rock; reacting in a fifth treatment zone the ammonium fluosilicate crystals separated in said third and fourth separation zones with ammonium bisulphate to produce fluosilicic acid and ammonium sulphate; recycling the thus produced fluosilicic acid to said fourth treatment zone for reaction with said ammonium sulphate; subjecting the ammonium sulphate produced in said fifth treatment zone to the stripping action of hot $CO_2$ containing gas to regenerate ammonium bisulphate and ammonia; utilizing said ammonium bisulphate for further reaction with ammonium fluosilicate crystals and recycling the thus generated ammonia and spent $CO_2$ gas to said second treatment zone for carbonate production.

14. Process of producing sulphuric acid from ammonium sulphate and fluosilicic acid which comprises; reacting in an aqueous solution ammonium sulphate with fluosilicic acid to produce product sulphuric acid and ammonium fluosilicate crystals; separately recovering said ammonium fluosilicate crystals from said sulphuric acid and reacting the separated ammonium fluosilicate crystals with an ammonium bisulphate melt to produce an ammonium sulphate melt and fluosilicic acid.

15. Process according to claim 14, wherein the thus produced ammonium sulphate melt is decomposed to regenerate ammonium bisulphate and ammonia gas.

16. Process according to claim 14, wherein the product sulphuric acid is used in the acidulation of phosphatic material to produce phosphoric acid, calcium sulphate and fluosilicic acid.

17. Process according to claim 16, wherein the phosphoric acid is concentrated with the addition of ammonia to crystallize ammonium fluosilicate.

References Cited
UNITED STATES PATENTS

| | | | |
|---|---|---|---|
| 1,247,165 | 11/1917 | Stahl | 23—88 |
| 1,313,379 | 8/1919 | Hechenbleikner | 23—165 |
| 2,636,806 | 4/1953 | Winter | 23—88 |
| 2,838,373 | 6/1958 | Stricker | 23—119 |

OSCAR R. VERTIZ, Primary Examiner

G. A. HELLER, Assistant Examiner

U.S. Cl. X.R.

23—88, 153, 167